United States Patent
Tritschler et al.

(10) Patent No.: US 12,060,897 B2
(45) Date of Patent: Aug. 13, 2024

(54) ACTUATOR AND CORRESPONDING METHOD

(71) Applicant: AUMA Riester GmbH & Co. KG, Müllheim (DE)

(72) Inventors: Matthias Tritschler, Hartheim (DE); Peter Malus, Müllheim (DE); Lutz Stöcklin, Weisweil (DE); Guido Koch, Karlsruhe (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 0 days.

(21) Appl. No.: 17/917,329

(22) PCT Filed: May 6, 2021

(86) PCT No.: PCT/EP2021/062081
§ 371 (c)(1),
(2) Date: Oct. 6, 2022

(87) PCT Pub. No.: WO2021/224433
PCT Pub. Date: Nov. 11, 2021

(65) Prior Publication Data
US 2023/0151827 A1 May 18, 2023

(30) Foreign Application Priority Data
May 8, 2020 (DE) .......................... 102020112548.8

(51) Int. Cl.
*F15B 1/04* (2006.01)
*F15B 1/027* (2006.01)
(Continued)

(52) U.S. Cl.
CPC ................ *F15B 1/04* (2013.01); *F15B 1/027* (2013.01); *F15B 15/00* (2013.01); *F16H 25/18* (2013.01); *F16H 57/00* (2013.01); *F16K 31/047* (2013.01); *F16K 37/0008* (2013.01); *F16H 37/122* (2013.01); *F16H 57/0006* (2013.01); *F16H 2057/0081* (2013.01); *F16K 31/05* (2013.01)

(58) Field of Classification Search
CPC .. F15B 15/00; F15B 1/027; F15B 1/04; F16K 31/05
See application file for complete search history.

(56) References Cited

U.S. PATENT DOCUMENTS 3,416,566 A 12/1968 Anderson
3,422,328 A 1/1969 Anderson et al.
(Continued)

FOREIGN PATENT DOCUMENTS

AT 411704 4/2004
DE 3840125 5/1990
(Continued)

*Primary Examiner* — Kenneth Bomberg
*Assistant Examiner* — Daniel S Collins
(74) *Attorney, Agent, or Firm* — Volpe Koenig

(57) ABSTRACT

An actuator (1) having an energy accumulator (6), with which an emergency drive (5) can be supplied, is configured to be tensioned by an electric motor (2). The motor (2) displaces at least one engaging element (41, 42) of the energy accumulator (6), on which a restoring force of the energy accumulator (6) acts, along an actuating travel in normal operating mode.

17 Claims, 10 Drawing Sheets

(51) Int. Cl.
  *F15B 15/00* (2006.01)
  *F16H 25/18* (2006.01)
  *F16H 57/00* (2012.01)
  *F16K 31/04* (2006.01)
  *F16K 37/00* (2006.01)
  *F16H 37/12* (2006.01)
  *F16K 31/05* (2006.01)

(56) References Cited

U.S. PATENT DOCUMENTS

| | | |
|---|---|---|
| 3,512,421 A | 5/1970 | Anderson |
| 3,518,891 A | 7/1970 | Denkowski |
| 3,675,420 A * | 7/1972 | Adams .................. F16K 31/12 60/471 |
| 3,705,594 A | 12/1972 | Placek |
| 4,089,398 A | 5/1978 | Stratienko |
| 4,090,589 A | 5/1978 | Fitzwater |
| 4,111,070 A | 9/1978 | Stratienko |
| 4,113,063 A | 9/1978 | Troy |
| 4,248,104 A | 2/1981 | Wood, III |
| 4,492,346 A | 1/1985 | Young |
| 5,195,721 A | 3/1993 | Akkerman |
| 5,984,260 A | 11/1999 | Rawson et al. |
| 6,129,333 A | 10/2000 | Ma |
| 6,231,027 B1 | 5/2001 | Baker et al. |
| 6,488,260 B1 | 12/2002 | Dietz |
| 6,572,076 B1 | 6/2003 | Appleford et al. |
| 6,997,430 B2 | 2/2006 | Denning et al. |
| 9,114,798 B1 | 8/2015 | Fox et al. |
| 2003/0145667 A1 | 8/2003 | Donald et al. |
| 2007/0075285 A1 | 4/2007 | Lovejoy |
| 2011/0114860 A1 | 5/2011 | Schade et al. |
| 2012/0298894 A1 | 11/2012 | Fuehrer |
| 2016/0273561 A1 | 9/2016 | LeBlanc et al. |

FOREIGN PATENT DOCUMENTS

| | | |
|---|---|---|
| DE | 102009022700 | 12/2010 |
| DE | 102010007137 | 8/2011 |
| DE | 102014010182 | 1/2016 |
| WO | 0190621 | 11/2001 |
| WO | 2009104072 | 8/2009 |
| WO | 2019002632 | 1/2019 |

* cited by examiner

ACTUATOR AND CORRESPONDING METHOD

INCORPORATION BY REFERENCE

The following documents are incorporated herein by reference as if fully set forth: PCT Application No. PCT/EP2021/062081, filed Mar. 6, 2021; and German Patent Application No. 10 2020 112 548.8, filed May 8, 2020.

TECHNICAL FIELD

The invention relates to an actuating drive with a motor and an output which can be driven by the motor and can be coupled to a fitting, and with an emergency drive with an energy store, by way of which the output can be driven as an alternative to the motor.

Furthermore, the invention relates to a method for loading an energy store of an actuating drive.

BACKGROUND

It is known for actuating drives which can be configured for connection to a fitting and for actuation of the fitting to be equipped with an emergency drive, in order to move the respectively connected fitting into a defined position or attitude in the case of an interruption of a primary energy supply, for example a power failure.

DE 38 40 125 A1 discloses a slide device for variable throttling of the outflow of waste water from waste water reservoirs or sewers. It has an actuator that can be connected to an electrical network for adjusting the slide and an emergency actuation device that has an emergency drive device. This device provides control and/or switching means that respond to the failure of the mains voltage and, as a result of the failure of the mains voltage, activate the emergency drive device, which is used to move the slide into a predetermined safety position and can be operated using energy from at least one energy store.

US 2007/075285 A1 shows a turbine steam valve actuator that provides both precise modulation of valve position control and independently enables fail-safe emergency closing of the valve regardless of the modulated position. This device includes a tandem arrangement of an electric valve actuator (roller or ball screw driven) operated by a conventional servo position controller with resolver feedback, and a hydraulic cylinder of equal or greater stroke fed by a conventional synthetic fluid supply system. The electric actuator and hydraulic cylinder are reversible and can be used to directly couple steam valve stems or to operate rotary lever valve assemblies.

EP 2 255 115 A1 discloses an actuating apparatus for a shut-off slide, with a spindle which can be moved in a linear manner in an actuating housing which can be connected to the shut-off slide, the spindle acting on the shut-off slide, in order to displace the shut-off slide between an open and a closed position, the spindle being driven by a motor in a first direction into a stationary operating position, and being preloaded in this position by means of a spring element, acting on the spindle, in a second, opposite direction into a switch-off position.

SUMMARY

The invention is based on the object of reducing the structural complexity of an actuating drive.

One or more of the features disclosed herein are provided to achieve the stated object. In particular, in order to achieve the stated object in the case of an actuating drive of the type described at the outset, it is therefore proposed according to the invention that the energy store is a pneumatic energy store. Therefore, an energy store can be used which can be configured with a lower dead weight than an energy store with mechanical spring power, because the mechanical springs can be dispensed with. The structural complexity can therefore be reduced. It is advantageous, furthermore, that a physically independent system can be provided for the emergency drive.

Here, the fitting can be configured, for example, as a valve, slide, tap or flap, or can have at least one valve, one slide, one tap and/or one flap.

According to the invention, the energy store has a pressure chamber with an expandable volume, it being possible, during operation of the emergency drive, for an expansion movement of the pressure chamber to be conducted to the output. In this way, a pressure force which can be developed in the energy store can be converted directly into a drive of the output. An operation of compressors for operating the emergency drive can be dispensed with.

It is provided according to the invention that, for the renewed loading of the energy store and the return to regulating operation, the actuating drive is operated in a direction, in the case of which the energy store is pressed against a stop.

It is preferably provided that a, in particular the abovementioned, pressure chamber can be operated in a manner which is closed to the outside during operation. A compressor for operation can therefore be dispensed with, and/or the relieved energy store can be preloaded with an initial pressure.

It can be provided in the case of one advantageous refinement that the energy store is connected to a monitoring device which is configured to monitor an operating pressure of the energy store. In this way, an operational readiness of the emergency drive can be monitored simply.

It can be provided in the case of one advantageous refinement that the energy store is connected to a filling device which is configured to increase the or an operating pressure of the energy store by way of the supply of gas. In this way, charging of the energy store and/or establishing of a functional capability of the emergency drive can be carried out simply.

For example, compressed air or nitrogen or a different gas can be used as gas, for example in a manner which is dependent on further requirements such as explosion protection or flammability or availability.

It can be provided in the case of one advantageous refinement that the energy store has at least one pressure chamber which is delimited by way of at least one pot and at least one piston which is guided movably in the pot. In this way, a pressure force can be converted in a simple way into a mechanical force which can be utilized for driving the output.

It can be provided here that a seal is configured between the piston and the pot, which seal, by way of its position, divides the pressure chamber into two part chambers which are connected fluidically. In this way, a space which is moved through by the seal during the expansion can be utilized for storing compressed air which can be used for driving the expansion.

It can be provided in the case of one advantageous refinement that one of two part chambers, in particular one of the two abovementioned part chambers, of a, in particular the abovementioned, pressure chamber is configured in a, in particular the abovementioned, piston of the energy store. In this way, a space for receiving energetically charged air can be provided in a movable part of the energy store.

It can be provided in the case of one advantageous refinement that one of two part chambers, in particular one of the two part chambers, of a, in particular the abovementioned, pressure chamber is configured in a, in particular the abovementioned, pot of the energy store. In this way, a space for receiving energetically charged air can be provided in a stationary part of the energy store.

It can be provided in the case of one advantageous refinement that a further pressure chamber is connected fluidically to the pressure chamber. In this way, an energy store for energetically charged air can be enlarged.

The further pressure chamber can be connected here for example to a, in particular the abovementioned, pot. In this way, additional, energetically charged air can be provided simply in the pressure chamber.

It can be provided here that the further pressure chamber encloses the pressure chamber. In this way, additional axial installation space for the further pressure chamber can be dispensed with.

It can be provided here as an alternative or in addition that the further pressure chamber is delimited by way of an outer side of the pot. In this way, additional walls can be reduced. In this way, moreover, a radial space requirement can be kept lower.

As an alternative or in addition, in order to achieve the stated object in the case of an actuating drive of the type mentioned at the outset, it can be provided according to the invention that the energy store can be charged by way of the preferably electric motor. It is advantageous here that a further motor for charging the energy store can be dispensed with. In this way, a structural complexity of the actuating drive can be reduced.

Here it is provided that the charging can be brought about by way of actuation of the motor against an end position of the actuating drive. In this way, switchable engagement of the motor to the energy store for charging purposes can be dispensed with. Furthermore, it is provided that the energy store is a pneumatic energy store.

It can be provided in the case of one advantageous refinement that the energy store has a spring force accumulator. In this way, an alternative energy store can be provided, for example for applications, in which a use of compressed air is not desired or is not possible.

It is particularly favorable if the spring force accumulator and the pneumatic energy store can be swapped, for example in order to form a range of actuating drives, in the case of which, beyond a type of energy store, the remaining parts and components can be selected to be identical.

It can be provided in the case of one advantageous refinement that the emergency drive and the motor are arranged in series in relation to the output. In this way, a torque which is developed by the motor can be utilized to charge the energy store in a simple way.

It can be provided here that the emergency drive is arranged in a drive train between the motor and the output. In this way, a compact actuating drive can be formed.

It can be provided in the case of one advantageous refinement that the emergency drive and the motor are arranged in parallel in relation to the output. In this way, a torque which is developed by the motor can be conducted past the emergency drive to the output in a simple way.

It can be provided in the case of one advantageous refinement that the emergency drive and the motor are coupled to one another in such a way that the torques and/or forces which are generated in each case are superimposed at the output. In this way, a coupling apparatus, for example for selective switching in of the motor or the emergency drive, can be dispensed with.

It can be provided in the case of one advantageous refinement that the motor is drive-connected via a self-locking gear mechanism to the output. It is advantageous here that a motor side of the actuating drive can be used as a supporting point for the emergency drive.

The emergency drive can preferably be driven in reverse by the output, for example in order to load the energy store.

It is preferably provided here that the motor is drive-connected via the self-locking gear mechanism to a coupling point of the motor and the emergency drive. In this way, it can be prevented that the emergency drive can drive the motor in reverse. In this way, the self-locking gear mechanism can be used as a stop, on which the emergency drive can be supported during its operation.

It can be provided in the case of one advantageous refinement that the energy store has a detector, by way of which achieving of a loaded state of the energy store can be detected. In this way, complete loading of the energy store can be monitored. Here, the motor can be switched off and/or can be capable of being switched off when the loaded state is detected.

It can be provided in the case of one advantageous refinement that the emergency drive and the motor are coupled to one another in such a way that the respectively generated torques are superimposed at the output. In this way, a torque which is developed by the motor can be introduced in a simple way to the energy store, by the output being blocked, for example.

It can be provided in the case of one advantageous refinement that the energy store has a locking apparatus, by way of which a discharge of the energy store can be blocked. It is advantageous here that a loaded state of the energy store can be conserved until driving by way of the emergency drive is required.

In the case of one advantageous refinement, the position of the locking apparatus can be detected. In this way, it can be detected simply and directly that emergency operation has taken place. This can be combined, for example, with detection of an associated end position being reached, as a result of which a termination of the emergency operation can be detected.

It can be provided in the case of one advantageous refinement that the output is a rotational output. In this way, the invention can be used in the case of fittings which are actuated by way of a rotational or pivoting movement.

It can be provided in the case of one advantageous refinement that the output is a translational output. In this way, direct drive by way of an expansion movement of the energy store can be carried out.

A dimension of the energy store can thus be such that, in the expanded state, the two limit position switches of an actuating travel of the actuating drive are actuated and/or the open locking apparatus is detected, preferably in combination with a limit position switch. This makes a simple detection of the expanded state and a simple distinction from the normal operation possible.

As an alternative or in addition, in order to achieve the stated object, the features of the further independent claim which is directed to a method are provided according to the invention. In particular, in order to achieve the stated object in the case of a method of the type described at the outset, it is therefore proposed according to the invention that the actuating drive is configured according to the invention, in particular as described above and/or as claimed in one of the claims directed to an actuating drive, the actuating drive being moved by way of the motor against an end stop, and the motor being operated until the energy store is charged. It is advantageous here that a switchover of a method of operation of the motor between an actuation of a connected fitting and loading of the energy store can be dispensed with. A directional change of the motor is not absolutely necessary.

It can be provided in the case of one advantageous refinement that the motor is switched off when a loaded state of the energy store is detected. In this way, thermal and/or mechanical overloading of the actuating drive can be avoided.

It can be provided in the case of one advantageous refinement that the energy store is preferably automatically blocked against a discharge in the loaded state. It is advantageous here that unintentional unloading of the energy store can be avoided.

It can be provided in the case of one advantageous refinement that, during operation of the emergency drive, the energy store is relieved until the two limit position switches of an actuating travel of the actuating drive are actuated at the same time, or an (upper) end position and the open locking apparatus are detected.

It can be provided in the case of one advantageous refinement that, in order to charge the energy store, at least one acting element of the energy store, on which a restoring force of the energy store acts, is moved along its actuating travel during normal operation. In this way, no additional installation space is required for loading of the energy store.

BRIEF DESCRIPTION OF THE DRAWINGS

The invention will now be described in greater detail on the basis of one exemplary embodiment, but is not restricted to the exemplary embodiment. Further exemplary embodiments result from the combination of the features of individual or multiple claims among one another and/or with individual or multiple features of the exemplary embodiment.

In the drawings.

DETAILED DESCRIPTION

Figures 1, 2:
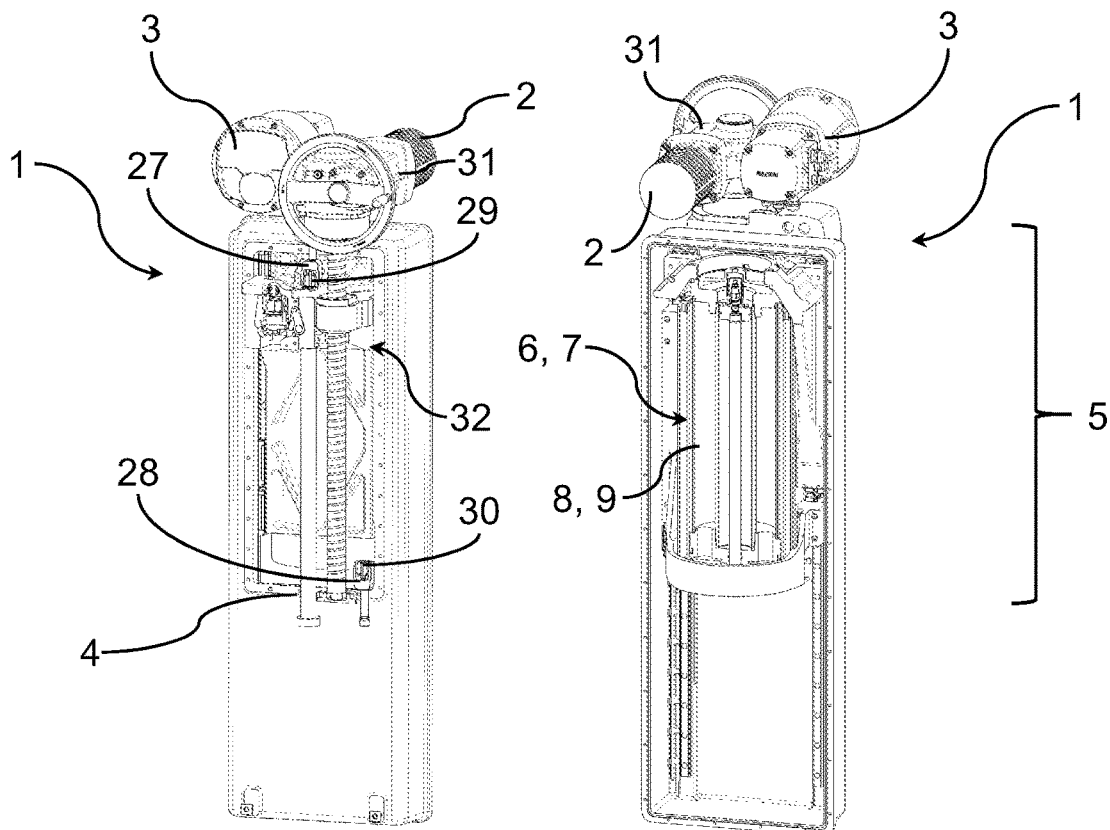
FIG. 1 shows an actuating drive according to the invention in a first actuating position in a view of the output in a partially open illustration.
FIG. 2 shows the actuating drive according to FIG. 1 in a view of the rear side and of the partially open energy store.

The figures will be described jointly in the following text.

An actuating drive which is denoted overall by 1 has a motor 2 which can be actuated by way of an output 3 in a manner known per se.

The actuating drive 1 has an output 4 which can be coupled in a manner known per se to a fitting (not shown in greater detail here). This fitting can therefore be actuated by way of the motor 2. For example, it can therefore be opened and/or closed by motor.

Moreover, the actuating drive 1 has an emergency drive 5, by way of which the output 4 can likewise be driven, for example when an energy supply of the electric motor 2 is interrupted.

To this end, the emergency drive 5 is fed from an energy store 6.

In the exemplary embodiment, the actuating drive 1 has a linearly movable output 4.

In the exemplary embodiment according to the figures which are shown, the energy store 6 is configured by way of example as a pneumatic energy store 7.

This pneumatic energy store 7 has a pressure chamber 8 which encloses an expandable volume 9 tightly to the outside.

The emergency drive 5 is driven by way of the expansion movement of this expandable volume 9 on account of a positive pressure in the pressure chamber 8.

Figure 16:
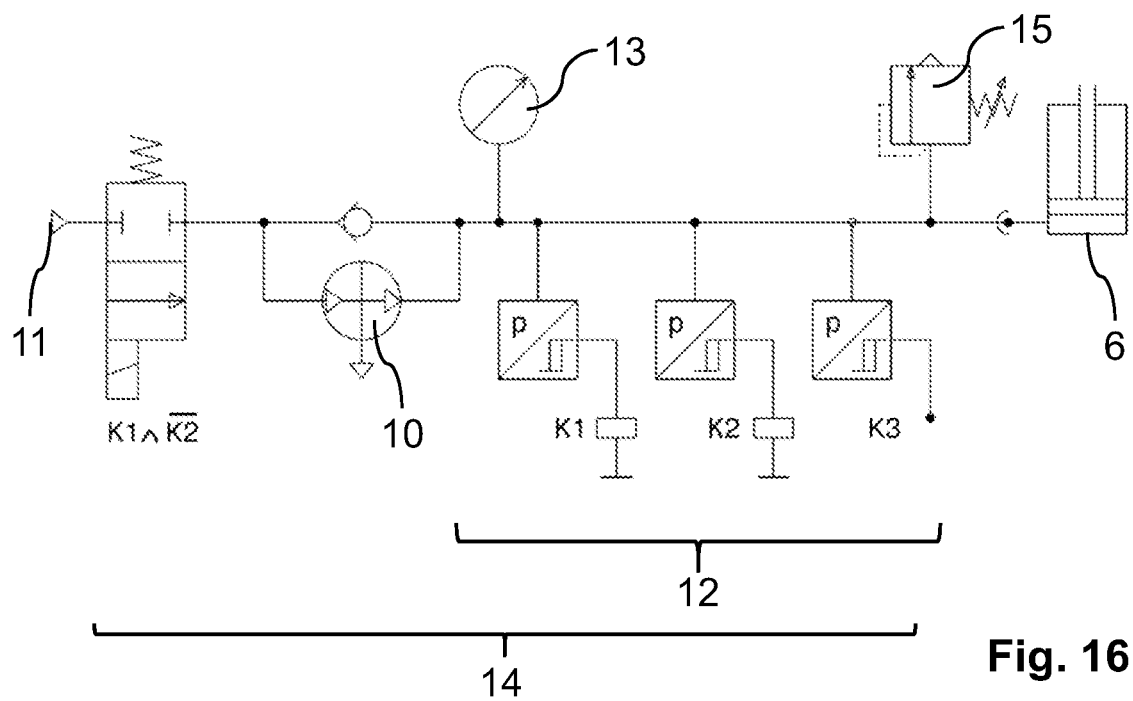
FIG. 16 shows a circuit diagram in order to explain the method of operation of an actuating drive according to the invention.
Figure 17:
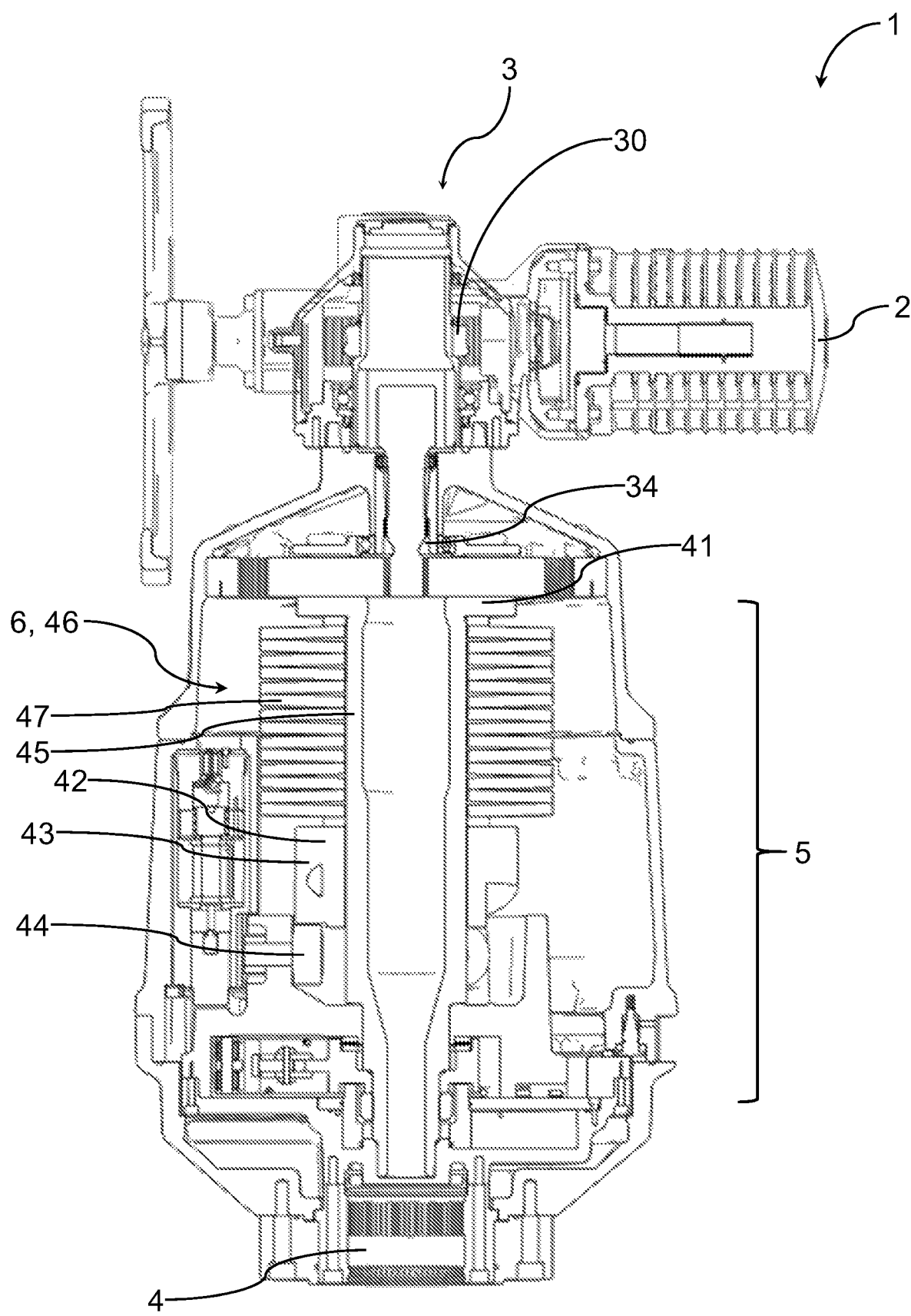
FIG. 17 shows a further actuating drive according to the invention with a spring force accumulator as energy store in an axial section.
Figure 18:
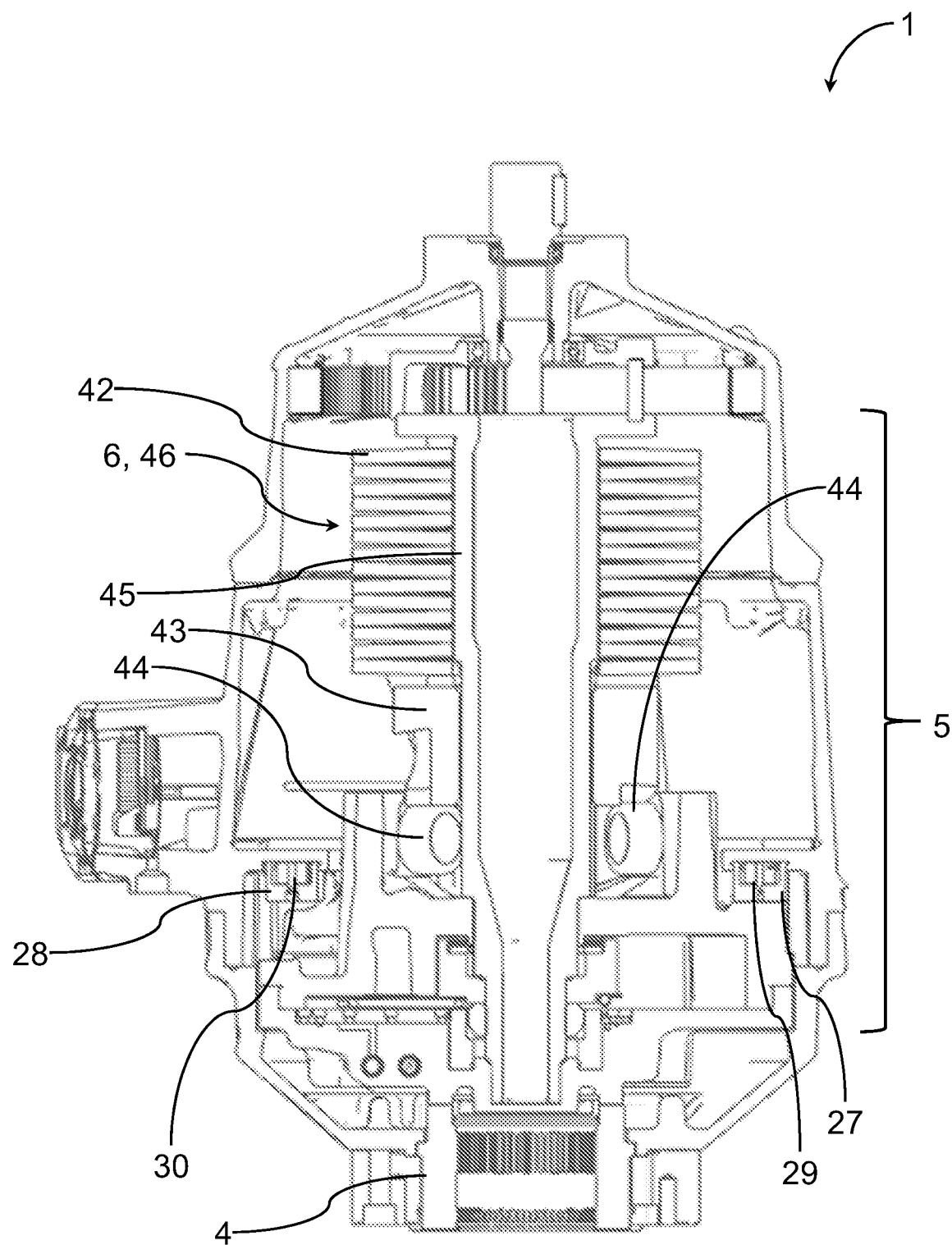
FIG. 18 shows the actuating drive from FIG. 17 without a handwheel and a motor in an axial section which is rotated by 90° with respect to FIG. 17.

FIG. 16 shows a pressure intensifier 10 which is connected to the pneumatic energy store 7 and which is fed from a gas supply 11 (shown here by way of example as a compressed air supply).

The pressure intensifier 10 is optional: for example, the compressed air supply can provide 6 bar of compressed air, and this pressure can be raised via the shown pressure intensifier 10, for example, to 10.5 bar without a further energy source. This option can be required or favorable if a supply pressure is insufficient in order to achieve the required force.

Here, a monitoring device 12 can be configured to detect an instantaneous operating pressure 13 in the pressure chamber 8 and to actuate a filling device 14 which can comprise the pressure intensifier 10 if the operating pressure 13 falls below a predefined value. In this way, the operating pressure 13 can be set or regulated by way of the filling device 14.

In the case of further exemplary embodiments, for example in the case of a gas supply which provides a different gas than compressed air, the monitoring device 12 can also be connected directly to the gas supply 11.

A pressure relief valve 15 protects the energy store 6 against overloading.

The pneumatic energy store 7 has a pot 16, in which a piston 17 is guided movably.

The abovementioned expansion movement is based on a movement of the piston 17 in the pot 16, which movement is driven by an operating pressure 13 which lies above the ambient pressure.

A circumferential seal 18 which seals the pressure chamber 8 to the outside is configured between the piston 17 and the pot 16.

In this way, the piston 17 and the pot 16 form two acting elements 41, 42 which can be moved toward one another counter to a pressure-induced restoring force.

The seal 18 delimits an imaginary dividing plane between a first part chamber 19 in the pot 16 and a second part chamber 20 in the piston 17. The first part chamber 19 is connected fluidically to the second part chamber 20 via communication openings 21.

When the piston 17 is extended in the pot 16, the seal 18 passes through the space 22 in the interior of the pot.

This space 22 is taken up by the second part chamber 20 before the expansion movement.

A further pressure chamber 23 which likewise uses the pot 16 as a bounding means is configured radially outside the pot 16. The further pressure chamber 23 is connected fluidically to the first part chamber 19, with the result that an air filling can flow with an overflow into the first part chamber 19.

As a result of this overall design which is nested inside one another, an axial installation space 24 of the non-expanded energy store can be designed in a minimum manner.

Here, the outer side 25 of the pot 16 forms an inner bounding means of the further pressure chamber 23.

As a result, a radial space requirement 26 of the energy store can be selected to be at a minimum.

The actuating drive 1 is equipped with two stops 27, 28 for in each case one end position. Here, the stop 27 serves for a first or upper end position of the actuating drive 1, as is shown in FIG. 1.

Figure 5:
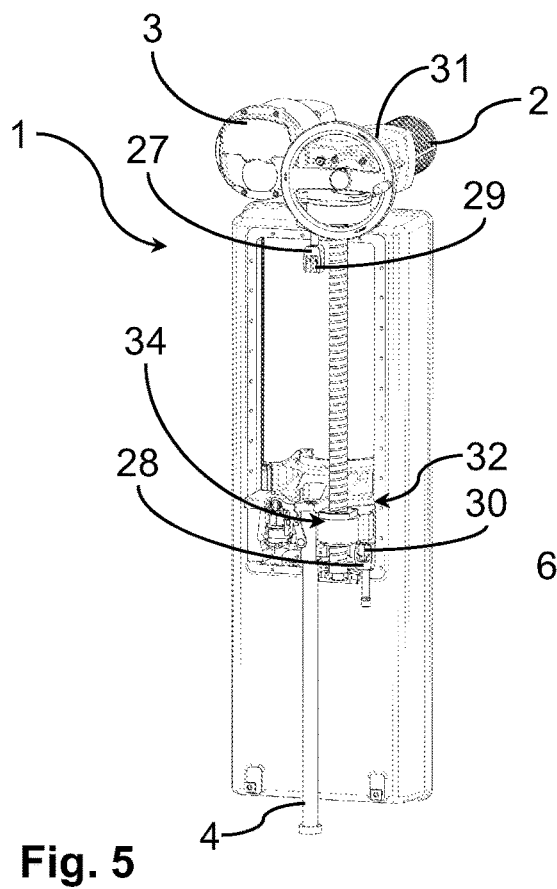
FIG. 5 shows the actuating drive according to FIG. 1 in a lower or second actuating position.

The stop 28 serves to define a further or lower end position of the actuating drive 1, as is shown in FIG. 5.

Here, the stop 27 has a first limit position switch 29, and the stop 28 has a second limit position switch 30.

A self-locking gear mechanism 31, for example a worm gear mechanism, is configured between the motor 2 and the output 4. The self-locking gear mechanism 31 has the function that the motor side cannot be driven in reverse via the output 4.

A spindle drive 32 which is configured here by way of example as a recirculating ball spindle is connected downstream of the self-locking gear mechanism 31.

In the case of further exemplary embodiments, the spindle drive 32 can as an alternative be of self-locking configuration, for example via a trapezoidal spindle. A further self-locking gear mechanism 31 can be dispensed with.

The motor side therefore forms a supporting point 34 for the action of the emergency drive 5 which is still to be described in more precise detail.

In the following text, the method of operation of the actuating drive 1 according to the invention will be described in greater detail on the basis of the movement sequence in FIGS. 1 to 8.

The starting point is the situation according to FIGS. 1 and 2. The energy store 6 is compressed completely, and the actuating drive 1 is moved into its upper actuating position which is defined by way of the stop 27. A connected fitting (not shown) is in a first functional end position.

The associated first limit position switch 29 is actuated.

If the actuating drive 1 is then actuated, the energy store 6 moves together with the output 4 in the direction of the stop 28 on account of the spindle drive 32.

Figures 3, 4:
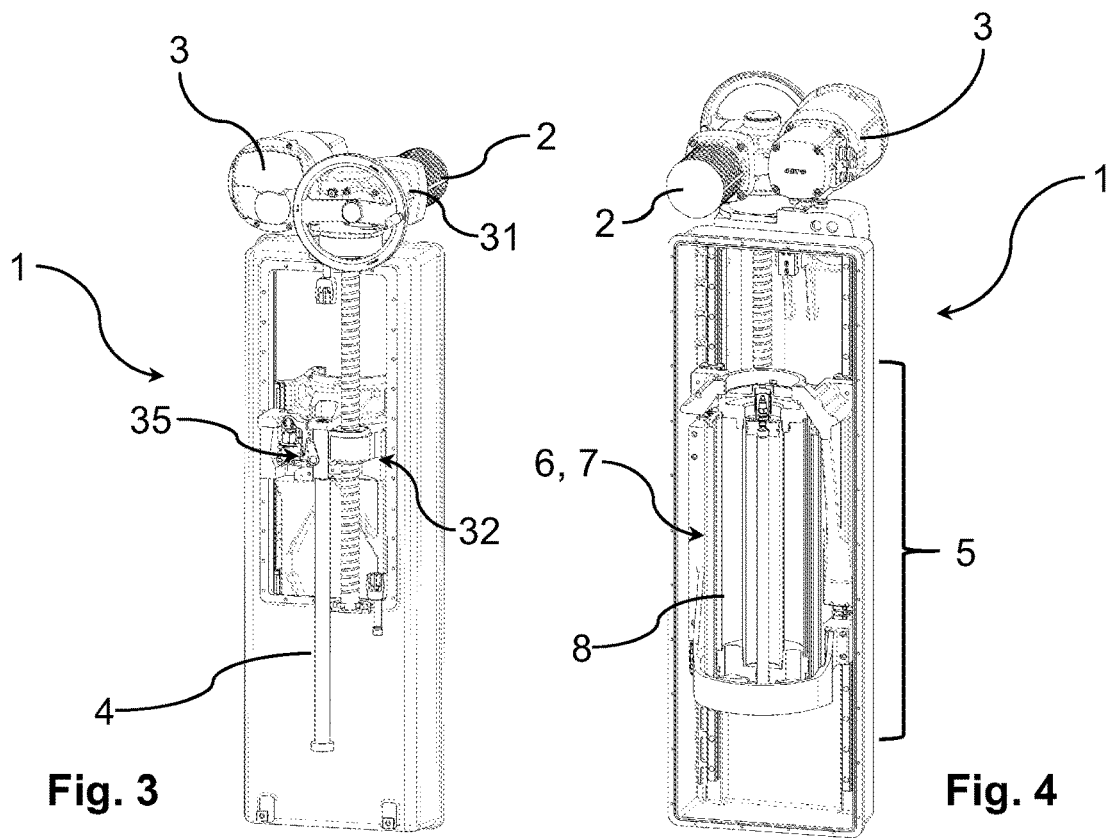
FIG. 3 shows the actuating drive according to FIG. 1 in an intermediate position.
FIG. 4 shows the actuating drive from FIG. 3 in a view from behind of the partially open energy store.

FIGS. 3 and 4 show an intermediate state of this movement.

Since the output 4 moves, the connected fitting is transferred into its second functional end position or is positioned in every intermediate position for regulation of the volumetric flow, in particular in a regulating operation.

This actuating movement can be continued until the stop 28 is reached and a second limit position switch 30 on this stop 28 is actuated.

Figure 6:
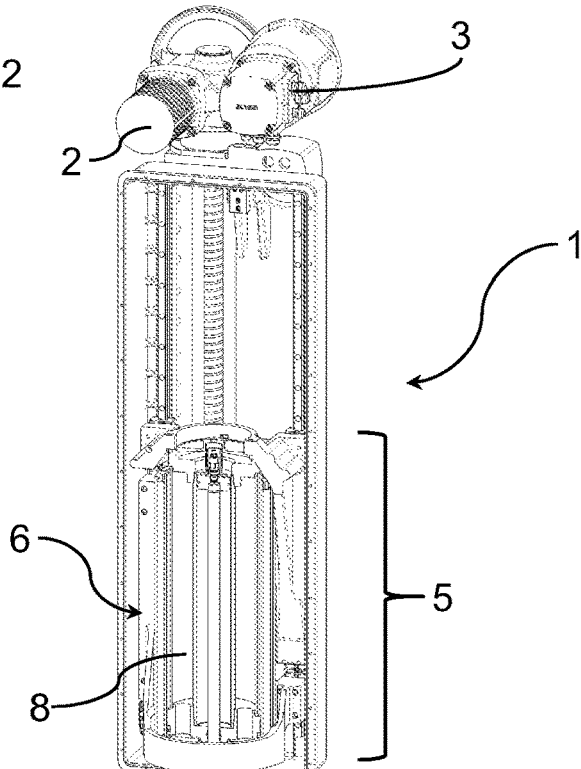
FIG. 6 shows the actuating drive according to FIG. 5 in a view from behind of the partially open energy store.
Figure 7:
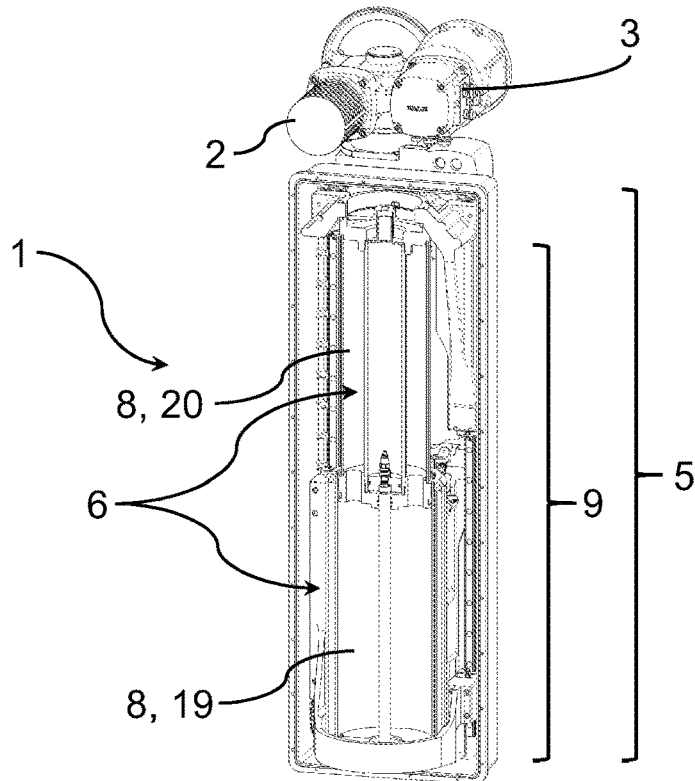
FIG. 7 shows the actuating drive according to FIG. 6 after unlocking of the emergency drive with a completely drained emergency drive.

FIGS. 5 and 6 show this situation.

If the emergency drive 5 is then triggered, a mechanical connection between the first acting element 41 and the second acting element 42, that is to say, between the pot 16 and the piston 17 here, is released. As will be described in more precise detail in the following text, this mechanical connection is released by way of the locking apparatus 36.

It can be provided, for example, that this locking apparatus 36 triggers automatically in the case of an interruption of the power supply of the motor 2.

In this way, the locking apparatus 36 actuates the coupling point 35, at which the forces which can be developed by way of the motor 2 or the emergency drive 5 act on the output 4.

On account of the operating pressure in the pressure chamber 8, the energy store 6 expands, and the acting elements 41 and 42 move away from one another.

The output 4 is connected rigidly to the movable acting element 42, that is to say, the piston 17, with the result that the output 4 is moved upward by way of the expansion movement.

This brings about a switchover or a change, for example opening or closing or a change in a fitting position of the fitting.

This movement finds its end at the latest at the stop 27.

Figure 8:
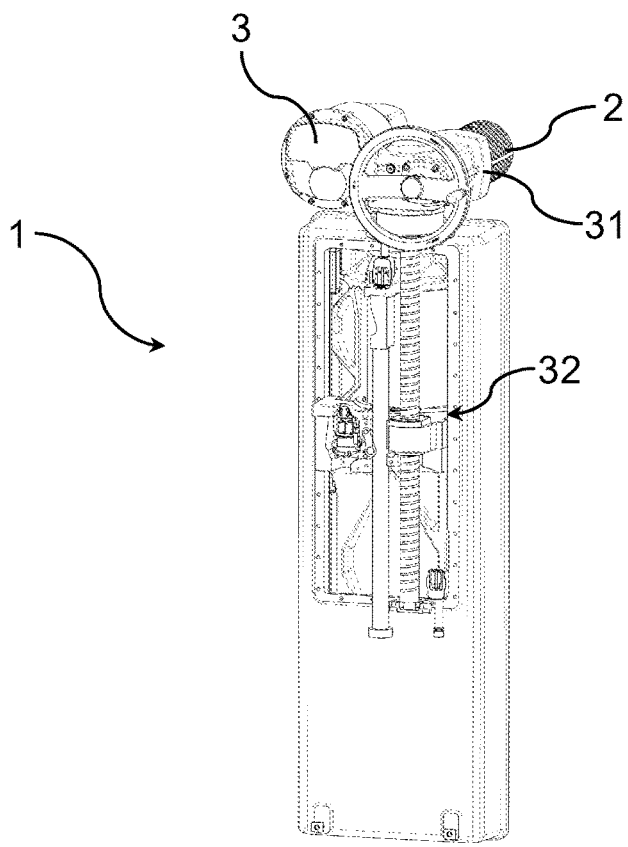
FIG. 8 shows the actuating drive from FIG. 3 with an unlocked and completely drained emergency drive.
Figure 9:
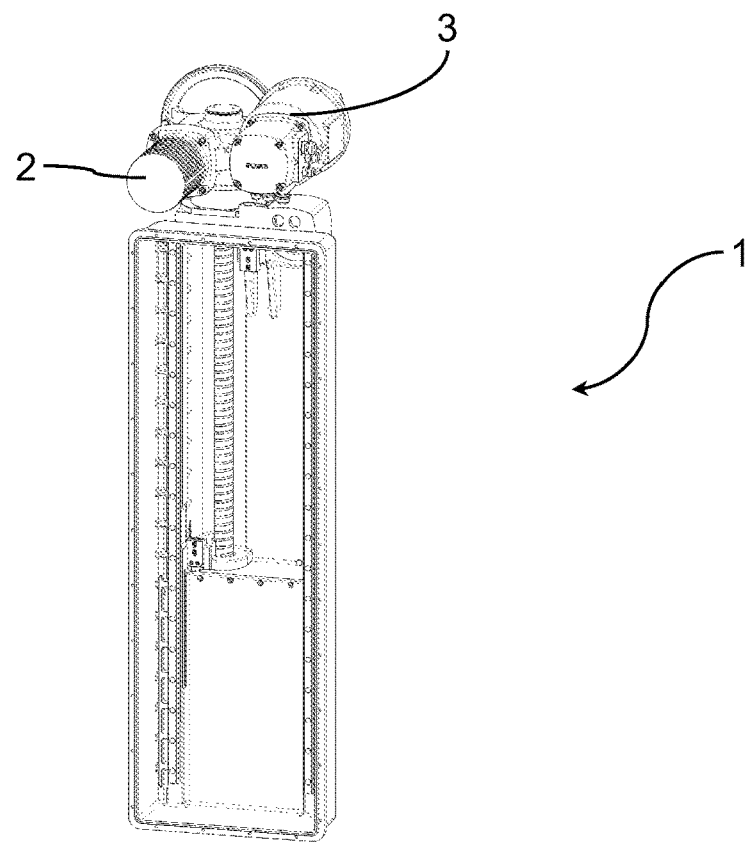
FIG. 9 shows the actuating drive according to FIG. 8 in a view from behind with a removed energy store.
Figure 10:
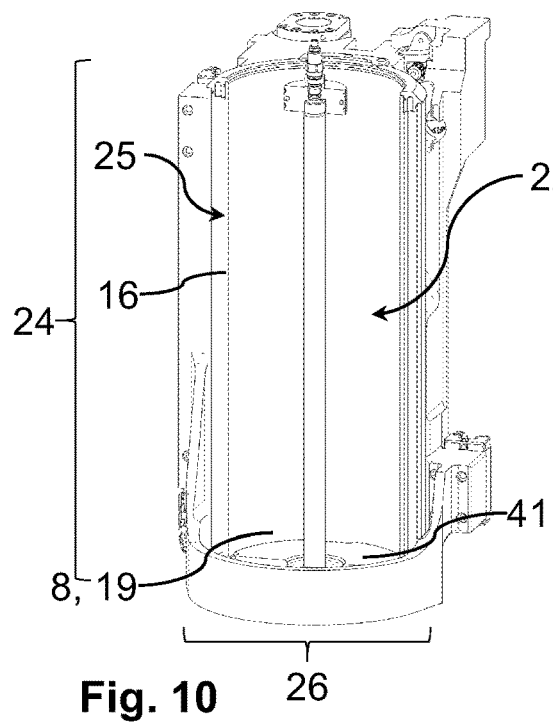
FIG. 10 shows the pot of the energy store of the actuating drive according to FIG. 1 in a partially cut-away illustration.
Figure 11:
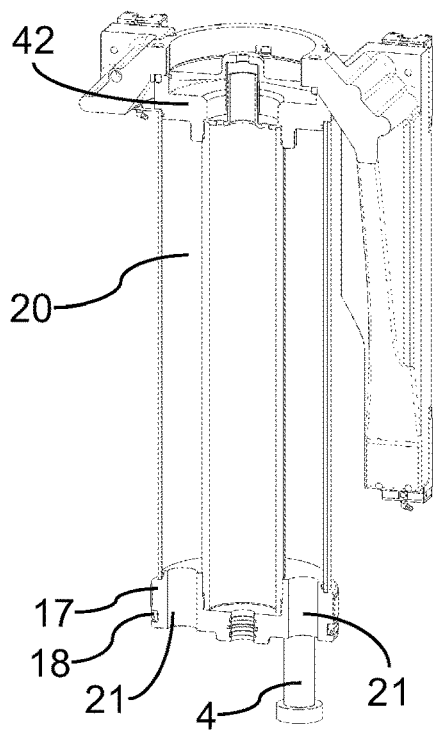
FIG. 11 shows the piston with the output of the energy store of the actuating drive according to FIG. 1.
Figure 12:
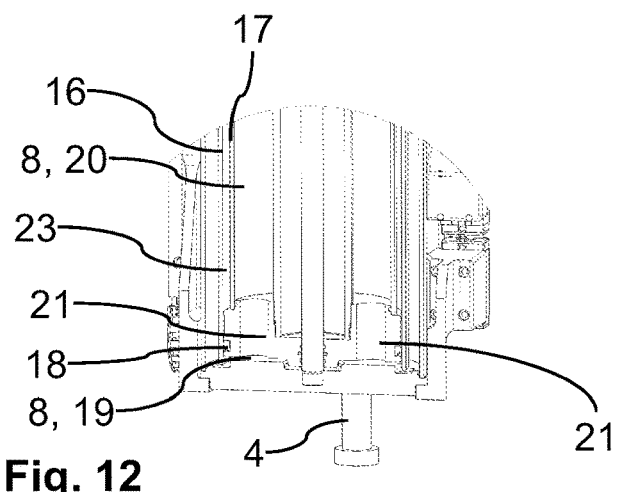
FIG. 12 shows an enlargement of a lower region of the assembled energy store of the actuating drive according to FIG. 1 in a sectional illustration.

FIG. 8 shows a situation, after the locking apparatus 36 has been opened in a middle position of the actuating range.

In this case, the energy store 6 can be relieved only partially until the stop 27 is reached.

For reloading of the energy store 6 and the return into the regulating operation, the actuating drive 1 is then operated in a direction, in the case of which the energy store 6 is pressed against the stop 27. Here, the first limit position switch 29 is ignored, which would normally lead to switching off of the motor 2.

For example, the control unit 3 can decide this afterward because the locking apparatus 36 is open.

The movement of the actuating drive beyond the reaching of the stop 27 and the actuation of the first limit position switch 29 leads to the energy store 6 being compressed again.

This method is continued until the acting elements 41 and 42 are moved again into a relative position with respect to one another, in which they can be latched or locked.

Figure 13:
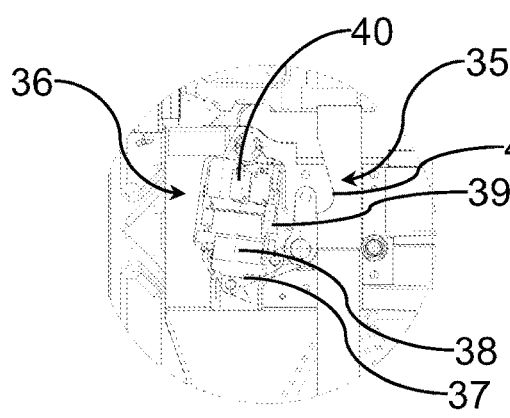
FIG. 13 shows the locking apparatus of the energy store of the actuating drive according to FIG. 1 in an unlocked position in a partially cut-away illustration.

FIG. 13 shows a detailed illustration of the locking apparatus 36 before this position is reached.

Here, the locking apparatus 36 has a toggle lever 37 which can be fixed in its almost stretched position by way of an electromagnet 38, for example a clamping magnet.

Furthermore, the locking apparatus 36 has a restoring element 39, by way of which the toggle lever 37 is pressed into the vicinity of its completely pushed-through position, in order to make an attraction of the electromagnet 38 possible.

Figure 14:
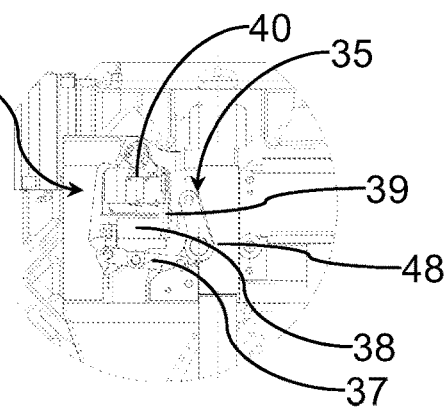
FIG. 14 shows the locking apparatus according to FIG. 13 in a locking position.
Figure 15:
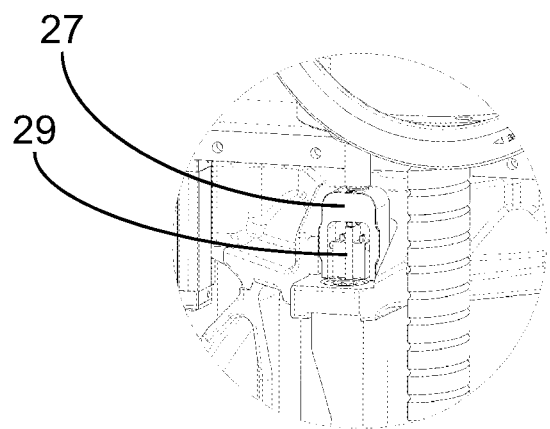
FIG. 15 shows an enlargement from FIG. 1 with an upper limit position switch.

FIG. 14 shows the state when the acting elements 41 and 42 are pressed so close to one another that a locking action is possible.

Here, the restoring element 39 has pressed the toggle lever 37 into a cutout 48, as a result of which the electromagnet 38 is positioned in such a way that a holding force can be developed electromagnetically.

In this state, the situation of FIGS. 1 and 2 is re-established.

FIGS. 17 to 21 show a further actuating drive 1 according to the invention. Components and functional units which are equivalent or identical structurally and/or functionally are denoted by way of the same designations and are not described again separately. The comments in respect of FIGS. 1 to 16 therefore apply mutatis mutandis to FIGS. 17 to 21.

The exemplary embodiment according to FIGS. 17 to 21 differs from the preceding exemplary embodiment in that the output 4 is of rotational configuration.

To this end, the movable acting element 42 of the energy store 6 acts on a cam disk 43. The cam disk 43 loads running rollers 44 which are arranged on the output 4.

This leads to an expansion movement of the energy store 6 being converted into a rotational movement of the output.

The motor 2 drives a central shaft 45 which can be locked to the output 4 by way of a locking apparatus 36.

In this way, the locking apparatus 36 actuates the coupling point 35, at which the torques which can be developed by way of the motor 2 and the emergency drive 5 are supported, in order to act on the output 4.

In this locked position, the energy store 6 is compressed, and is co-rotated during the normal actuation of the actuating drive 1.

In the exemplary embodiment which is shown, the energy store 6 has a spring force accumulator 46 with cup springs 47.

A pneumatic energy store 7 can also be used instead of the spring force accumulator 46, however.

Figure 19:
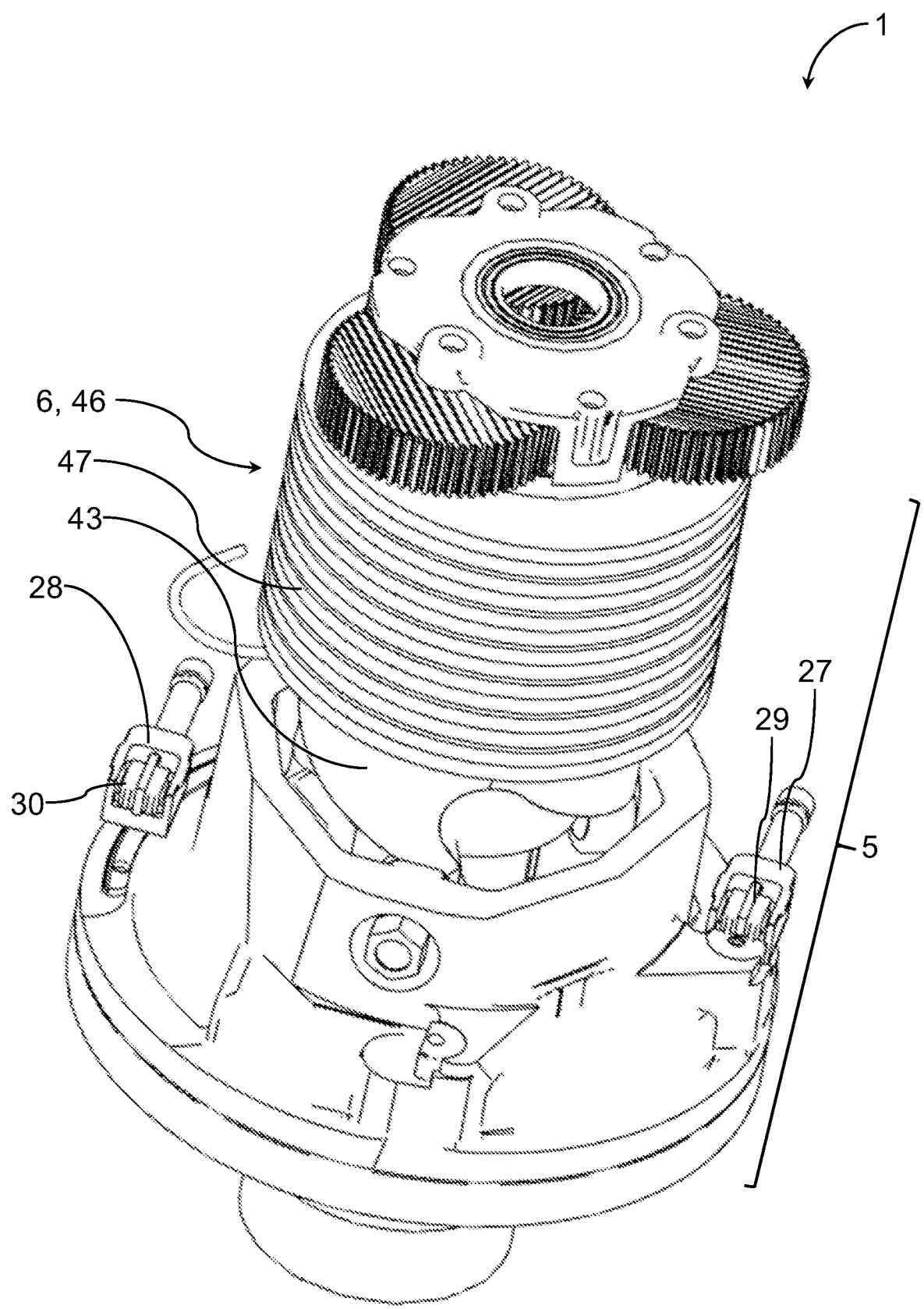
FIG. 19 shows the actuating drive from FIG. 18 without a housing in a three-dimensional oblique view of the energy store.
Figure 20:
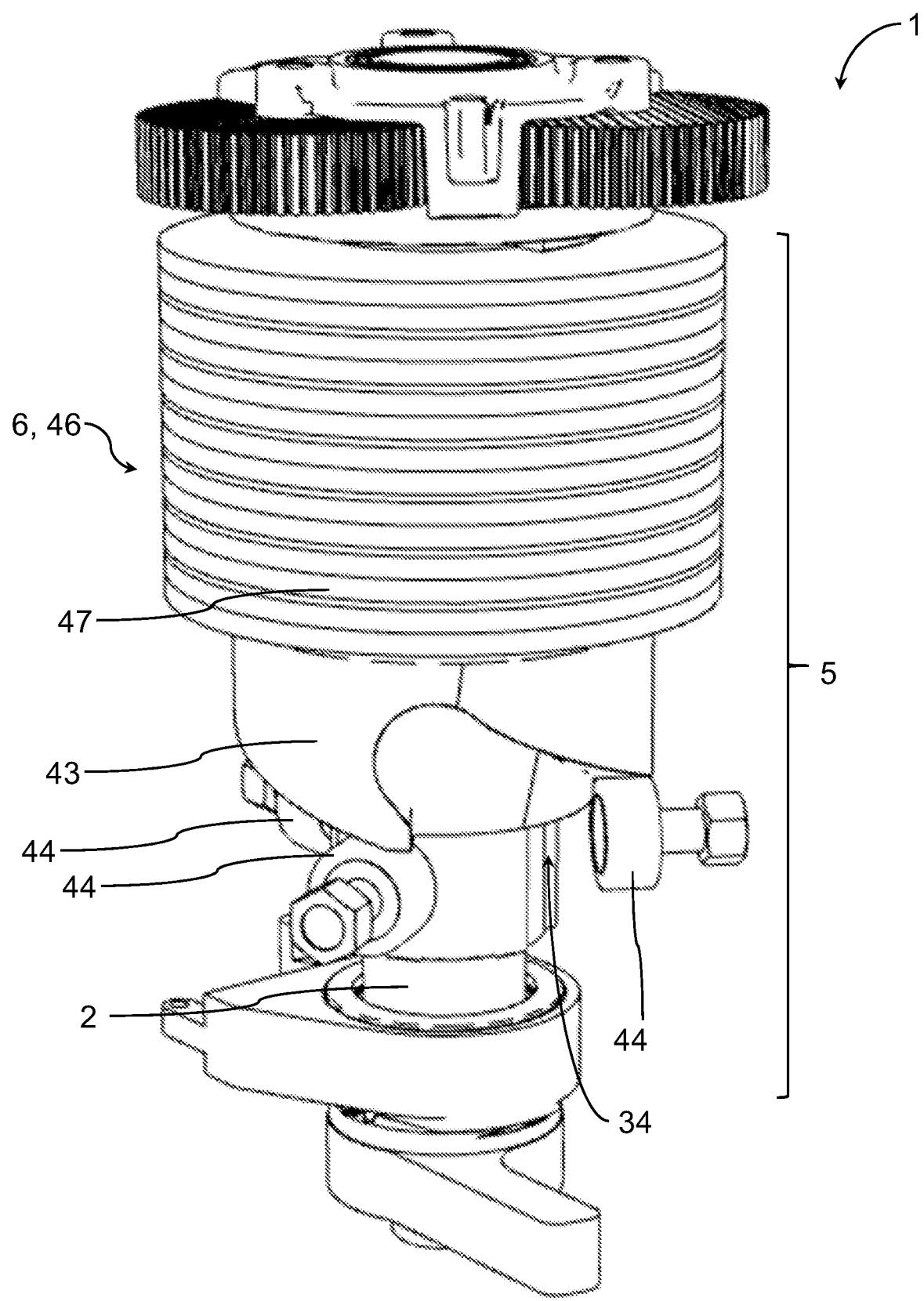
FIG. 20 shows the actuating drive from FIG. 19 without an output in a side view.
Figure 21:
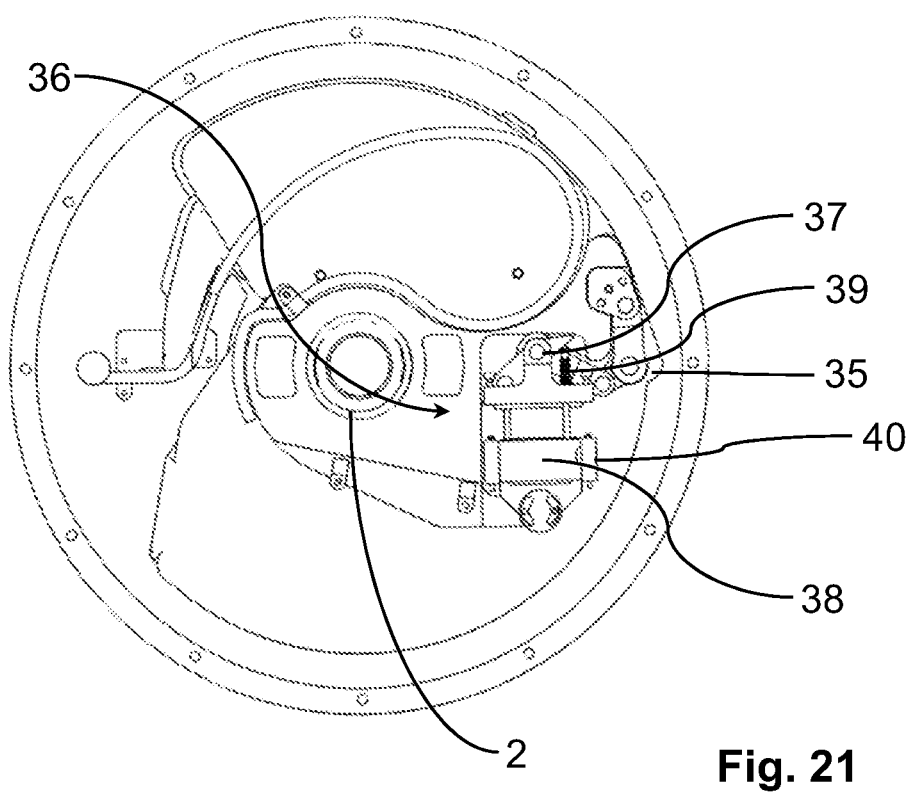
FIG. 21 shows the locking apparatus of the actuating drive from FIG. 17 in an axial view.

FIG. 19 shows that the output 4 can be moved against two stops 27, 28 which in each case define an end position of the actuating drive 1.

If the locking apparatus 36 is released in the situation according to FIG. 19, the output 4 can move independently of the central shaft 45.

As long as the motor 2 does not move, the central shaft 45 is fixed on account of the self-locking gear mechanism 31.

This leads to it being possible for the energy store 6 to be relieved in the case of an open locking apparatus 36, as a result of which the cam disk 33 forces the running rollers 44 and therefore the output 4 into a rotational movement.

This rotational movement runs until the second stop 28 is reached.

If the actuating drive 1 is then moved further in the same sense of direction, which actuating drive 1 would have to be switched off by way of the limit position switch 30, the cam disk 43 which is arranged non-rotationally but axially displaceably on the central shaft 45 continues to move and is pressed upward by way of the stationary running rollers 44. In this way, the spring force accumulator 46 is stressed.

This can be continued until the locking apparatus 36 latches, which can be detected by way of an associated third limit position switch 40 as detector. Here, a restoring spring 39 acts to press the toggle lever 37 into the cutout 48.

In this position, the actuating drive 1 is ready for a return of the connected fitting as far as the first end position which is defined by way of the stop 27.

It can therefore be said in general that the energy store 6 is relieved during operation of the emergency drive 5 in the case of the proposed exemplary embodiments until the limit position switch 30 of an actuating travel which is limited by way of the stop 28 is actuated.

It can also be seen from the drawings that a movable acting element 42, on which a restoring force of the energy store 6 acts and by way of which the energy store 6 can be stressed or loaded, is arranged in a manner which is guided axially displaceably in relation to a central shaft 45.

In the case of the actuating drive 1, it is therefore proposed for an energy store 6, by way of which an emergency drive 5 can be fed, to be configured such that it can be stressed by way of an electric motor 2, the motor 2 moving at least one acting element 41, 42 of the energy store 6, on which a restoring force of the energy store 6 acts, along an actuating travel of the normal operation.

LIST OF DESIGNATIONS

1 Actuating drive
2 (Electric) motor
3 Control unit
4 Output
5 Emergency drive
6 Energy store
7 Pneumatic energy store
8 Pressure chamber
9 Expandable volume
10 Compressor
11 Gas supply
12 Monitoring device
13 Operating pressure
14 Filling device
15 Pressure relief valve
16 Pot
17 Piston
18 Seal
19 First part chamber
20 Second part chamber
21 Communication openings
22 Space (which is moved through by the seal during the expansion)
23 Further pressure chamber
24 Axial installation space
25 Outer side
26 Radial space requirement
27 Stop for a (first) end position of the actuating drive
28 Stop for a (further) end position of the actuating drive
29 First limit position switch
30 Second limit position switch
31 Self-locking gear mechanism
32 Spindle drive
34 Supporting point
35 Coupling point 36 Locking apparatus
37 Toggle lever
38 Electromagnet
39 Restoring element
40 (Third, further) limit position switch
41 (First, stationary) acting element
42 (Second, movable) acting element
43 Cam disk
44 Running roller
45 Central shaft
46 Spring force accumulator
47 Cup spring
48 Cutout

The invention claimed is:

1. An actuating drive (1), comprising:
a motor (2);
an output (4) which is driveable by the motor (2) and is couplable to a fitting;
an emergency drive (5) with an energy store (6), by which the output (4) is driveable as an alternative to the motor (2),
the energy store (6) being a pneumatic energy store (7);
the energy store (6) including a pressure chamber (8) with an expandable volume;
wherein, during operation of the emergency drive, an expansion movement of the pressure chamber (8) is conducted to the output (4);
the energy store (6) is loaded by the motor (2) by actuation of the motor (2) after an end position of the actuating drive (1) is reached; and
the emergency drive (5) and the motor (2) are coupled to one another such that at least one of torques or forces which are generated in each case are superimposed at the output (4).

2. The actuating drive (1) as claimed in claim 1, wherein the pressure chamber (8) is closed during operation.

3. The actuating drive (1) as claimed in claim 1, wherein the energy store (6) is connected to a filling device (14) which is configured to increase an operating pressure (13) of the energy store (6) via a supply of air.

4. The actuating drive (1) as claimed in claim 1, wherein the energy store (6) has at least one pressure chamber (8) which is delimited by a pot (16) and a piston (17) which is guided movably in the pot (16), a seal (18) being located between the piston (17) and the pot (16), the seal (18) dividing the pressure chamber (8) into two part chambers which are connected fluidically.

5. The actuating drive (1) as claimed in claim 4, wherein at least one of a) one of the two part chambers (19, 20) is configured in the piston (17), or one b) of the two part chambers (19, 20) is configured in the pot (16).

6. The actuating drive (1) as claimed in claim 1, further comprising a further pressure chamber (23) connected fluidically to the pressure chamber (8), and at least one of a) the further pressure chamber (23) enclosing the pressure chamber (8) or b) the further pressure chamber (23) being delimited by an outer side (25) of the pot (16).

7. The actuating drive (1) as claimed in claim 1, wherein the energy store (6) has two acting elements which are pressable together against one another and counter to a restoring force.

8. The actuating drive (1) as claimed claim 1, wherein the emergency drive (5) and the motor (2) are arranged in series in relation to the output (4), with the emergency drive (5) being arranged in a drive train between the motor (2) and the output (4), or the emergency drive (5) and the motor (2) are arranged in parallel in relation to the output (4).

9. The actuating drive (1) as claimed in claim 1, wherein the motor (2) is drive-connected via a self-locking gear mechanism (31) to the output (4), to a coupling point (35) of the motor (2) and the emergency drive.

10. The actuating drive (1) as claimed in claim 1, wherein the energy store (6) has a detector configured to detect achieving of a loaded state of the energy store (6).

11. The actuating drive (1) as claimed in claim 1, wherein the energy store (6) has a locking apparatus (36) configured to block a discharge of the energy store (6).

12. The actuating drive (1) as claimed in claim 1, wherein the output (4) is at least one of a rotational or a translational output (4).

13. A method for operating the actuating drive (1) as claimed in claim 1, the method comprising:
moving the actuating drive (1) using the motor (2) against an end stop,
operating the motor (2) until the energy store (6) of the emergency drive (5) is charged;
loading the energy store (6) with the motor (2) by actuation of the motor (2) after the end position of the actuating drive (1) is reached; and
coupling the emergency drive (5) and the motor (2) to one another such that at least one of the torques or the forces which are generated in each case are superimposed at the output (4).

14. The method as claimed in claim 13, further comprising:
switching off the motor (2) when a loaded state of the energy store (6) is detected.

15. The method of claim 13, further comprising:
automatically blocking the energy store (6) against a discharge in a charged state.

16. The method as claimed in claim 13, wherein during operation of the emergency drive, relieving the energy store (6) until a limit position switch (29) of an actuating travel of the actuating drive (1) is actuated.

17. The method of claim 13, wherein in order to charge the energy store (6), at least one acting element of the energy store (6), on which a restoring force of the energy store (6) acts, is moved along an actuating travel thereof during normal operation.

* * * * *